Sept. 20, 1971   W. B. FELL   3,605,508

PRECISION THREADED ADJUSTMENT

Filed June 23, 1969

INVENTOR:
WILLIAM B. FELL

ATTORNEY

United States Patent Office 3,605,508
Patented Sept. 20, 1971

3,605,508
PRECISION THREADED ADJUSTMENT
William B. Fell, 320 McLain Ave.,
Rockford, Ill. 61102
Filed June 23, 1969, Ser. No. 835,477
Int. Cl. F16h 27/02
U.S. Cl. 74—89.15
5 Claims

ABSTRACT OF THE DISCLOSURE

A hollow adjusting screw threads in a hole provided in one of two members and has a lost motion connection with a hollow adjusting head bearing on an annular shoulder at the upper end of the hole, this head having a hold-down screw extending through it and the first named screw and threading in a hole provided in the other member on which the lower end of the first named screw seats on a suitable washer. The head on the hold-down screw bears on an annular shoulder in the adjusting head and clamps the two members together. The adjusting screw and the hold-down screw have the same number of threads per inch but of opposite hand so after the members are roughly adjusted by means of the adjusting head and adjusting screw to approximately the desired extent and the hold-down screw is tightened enough to insure its turning with the adjusting screw, any fine adjustment thereafter of the adjusting screw with the adjusting head results in the hold-down screw turning with the other parts without disturbing the clamping action.

---

This invention relates to improved precision level adjusting screw means enabling very fine setting of a precision level either in a portable level base or in a fixed support on a machine or instrument equipped with a level.

The invention is illustrated in the accompanying drawing, in which.

The same reference numerals are applied to corresponding parts throughout the views.

Figure 2:
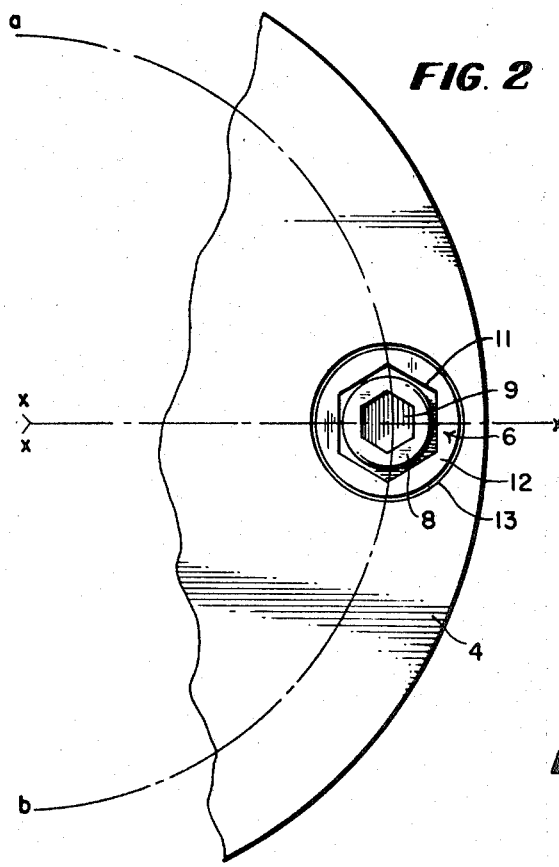
FIG. 2 is a plan view of FIG. 1.
Figure 1:
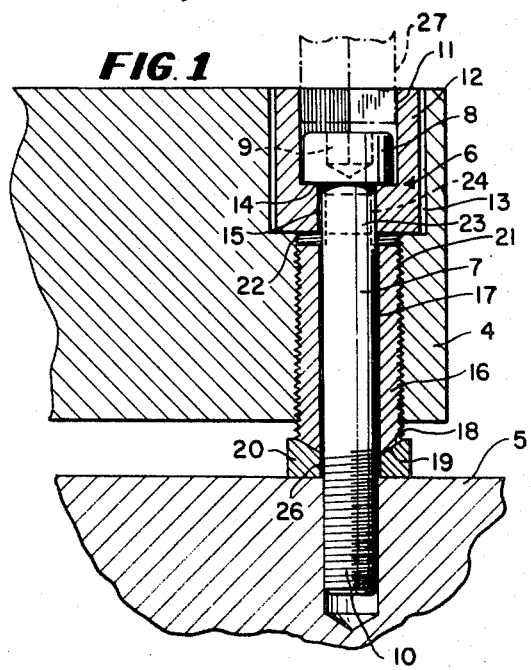
FIG. 1 is an enlarged longitudinal section through my improved precision threaded adjustment, the same being shown applied between the vial mounting ring of a micro-precision level and its supporting frame or base.

Referring to the drawing, the reference numerals 4 and 5 designate the vial mounting ring and supporting base, respectively, of a micro-precision circular level, frame 5 being of circular form for support of the circular level unit and having three precision threaded adjustments like the one indicated by the reference numeral 6 spaced 120° apart on the same radius with respect to the ring, 4 as indicated by the arcuate center line $a$–$b$ and the three radial center lines $x$—$x$ in FIG. 2. Each of these threaded adjustments 6 is for mounting the level on the base 5 or on a fixed support on a machine or instrument, and serves to maintain such adjustment once properly made. Each precision adjustment 6 comprises four parts, the first of which is a hold-down screw 7 having a circular head 8 at its upper end with a hexagonal socket 9 provided therein and a threaded lower end portion 10, the circular form of the head 8 enabling it to be turned in either direction in the hexagonal socket 11 provided in the second part, which is a cylindrical adjusting head 12 that is received in the hole 13 in the ring 4. The head 8 of the hold-down screw 7 bears at 14 on the annular shoulder defined at the lower end of the hexagonal socket 11 in the head 12 around the center hole 15 provided in the bottom of the adjusting head 12 for freely receiving the hold-down screw 7, as seen in FIG. 1. The third part is the adjusting screw 16, which has a central longitudinal bore 17 extending therethrough for loosely receiving the shank of the hold-down screw 7, this adjusting screw 16 having a beveled or tapered lower end 18 for a self-centering fit in the concave top 19 of the fourth part 20, which is a flat bottomed washer that is adapted to be seated on the flat top of the base 5. The adjusting screw 16 is adjustably threaded in the threaded bore 21 that forms a reduced coaxial extension of the hole 13 in the ring 4, and, as clearly appears in FIG. 1, there is adequate working clearance at 22 for adjustment purposes between the upper end of the adjusting screw 16 and the bottom of the adjusting head 12. Diametrically opposed key projections 23 are provided on the upper end of the adjusting screw 16 and these two keys have a close working fit in diametrically opposed key-ways 24 provided in the bottom portion of the adjusting head 12. The threads 25 on the adjusting screw 16 are fairly fine and of the same fineness as the threads 10 on the hold-down screw 7, but of opposite hand. Thus, for example, and without implying any limitations, assuming threads 10 are right-hand and have 56 threads per inch, threads 25 are left-hand and of the same number per inch. In passing, the hole 26 in washer 20 is of about the same diameter as the bore 17 in screw 16 and hole 15 in the bottom of the adjusting head 12, all with a view to permitting such small inclination of the adjusting screw 16 with respect to base 5 as may result from adjustment for leveling purposes without interference by the hold-down screw 7 when getting the level ring 4 properly adjusted with respect to the base.

Figure 3:
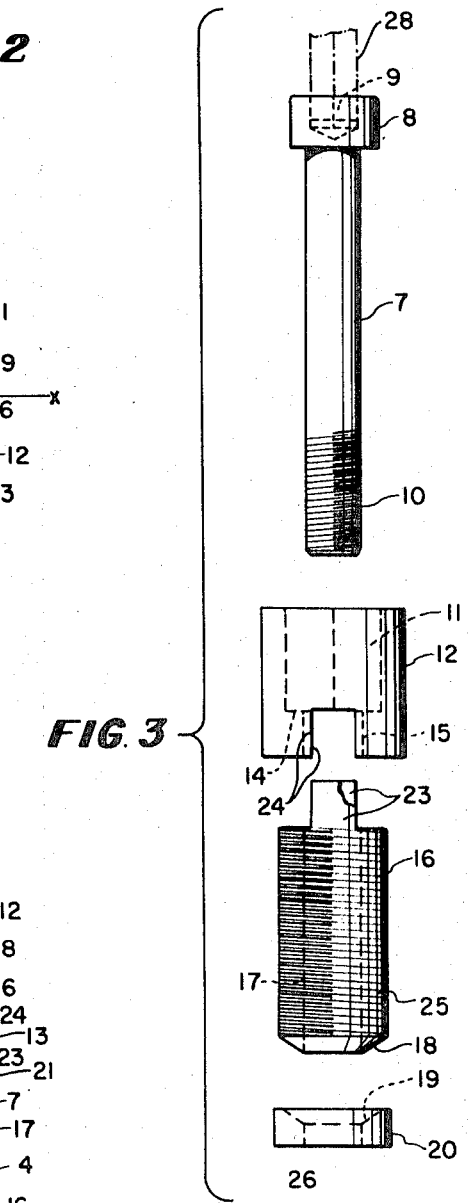
FIG. 3 is an exploded view showing in side elevation and coaxially arranged in spaced relation the four parts shown in assembled relation in FIG. 1, wherein three of the parts appear in cross-section.

In operation, the three adjusting screws 16 are first roughly adjusted with a hex-wrench 27 entered in socket 11 in adjusting head 12 while the three hold-down screws 7 are still fairly loose. Then the hold-down screws 7 are all tightened using a smaller hex-wrench 28 (FIG. 3) entered in sockets 9. Then the final and finer adjustment is made, sometimes with only one of the adjusting heads 12 requiring a slight adjustment clockwise or counterclockwise. Occasionally two of the three adjusting heads 12 will require such adjustment. It is in this final adjustment that the same number of threads but of opposite hand on the adjusting screw 16 at 25 and on the hold-down screw 7 at 10 becomes so important, because in this slight adjustment of the head 12 clockwise or counterclockwise the clamping action at shoulder 14 between the head 8 of the hold-down screw 7 and the adjusting head 12 is sufficient to cause the adjusting screw 7 to turn in the same direction, but, due to the opposite hand threading coupled with the same number of threads per inch on the two parts involved, namely, adjusting screw 16 and hold-down screw 7, the desired leveling adjustment is obtained without changing the relationship of the hold-down screw 7 to the adjusting head 12.

It is believed the foregoing description conveys a good understanding of the objects and advantages of my invention. While a prefered embodiment of the invention has been illustrated and described, this is only for the purpose of illustration, and it is to be understood that various modifications in structure will occur to a person skilled in this art.

I claim:

1. In a precision threaded adjustment for precision spacing adjustment of one member with respect to another member, the combination of a hollow adjusting screw having external threads threaded in the first of said members for threading in either direction for the said adjustment relative to the second member on which one end of said screw rests, said adjusting screw having a beveled seat conforming to the beveled end of said screw, an adjusting head which rests on the first member and while separate and spaced from the other end of said adjusting screw is connected therewith so as to be nonrotatable with respect thereto and permit threaded adjustment of said adjusting screw in either direction by turning said adjusting head, and a hold-down screw extending through said adjusting head and adjusting screw and having a head at one end resting on said adjusting head, said hold-down screw being threadedly fixed at the other end to the second member, the threads on said hold-down screw and the threads on said adjusting screw being alike as to the number of threads per inch but of opposite hand, whereby when said hold-down screw is tightened to the point where it and the adjusting screw turn together said adjusting screw may be adjusted in either direction by means of said adjusting head without interference from said hold-down screw which adjusts with said adjusting screw without change in its holding action.

2. A structure as set forth in claim 1 wherein the connection between said adjusting head element and said adjusting screw element comprises a key projection on one element having a close sliding fit in a slot provided in the other element.

3. A structure as set forth in claim 1 wherein said adjusting head has a hex-socket provided therein in which the head of said hold-down screw which is round is rotatable and bears on an annular shoulder provided in the bottom of said hex-socket, said screw head also having a hex-socket provided therein for reception of a hex-wrench to tighten or loosen said hold-down screw, the other hex-socket being for reception of another hex-wrench for adjusting said adjusting screw.

4. A structure as set forth in claim 3 wherein the adjusting head is substantially wholly received and operates in a recess provided in the first of said members.

5. In a micro-precision universal circular level, a support member and a horizontal vial mounting ring member universally tiltably, adjustably mounted at three spaced points on said support member by means of precision adjustable screw means, each precision adjustable screw means comprising a hollow adjusting screw having external threads threaded in the first of said members for threading in either direction for the said adjustment relative to the second member on which one end of said screw rests, an adjusting head which rests on the first member and while separate and spaced from the other end of said adjusting screw is connected therewith so as to be nonrotatable with respect thereto and permit threaded adjustment of said adjusting screw in either direction by turning said adjusting head, and a hold-down screw extending with a predetermined radial clearance through said adjusting head and adjusting screw and having a head at one end resting on said adjusting head, said hold-down screw being threadedly fixed at the other end to the second member, said adjusting screw except as limited by said hold-down screw being tiltable universally relative to said second member, the threads on said hold-down screw and the threads on said adjusting screw being alike as to the number of threads per inch but of opposite hand, whereby when said hold-down screw is tightened to the point where it and the adjusting screw turn together, said adjusting screw may be adjusted in either direction by means of said adjusting head without interference from said hold-down screw which adjusts with said adjusting screw without change in its holding action.

References Cited
UNITED STATES PATENTS

| | | | |
|---|---|---|---|
| 783,845 | 2/1905 | Munro | 74—424.8 |
| 2,408,450 | 10/1946 | Schrader | 81—71 |
| 2,684,606 | 7/1954 | Brawley | 81—71 |
| 3,073,206 | 1/1963 | Rudolph | 81—90 |
| 3,402,613 | 9/1968 | Neusel et al. | 74—89.15 |

WILLIAM F. O'DEA, Primary Examiner

W. S. RATLIFF, Jr., Assistant Examiner

U.S. Cl. X.R.

81—71